(12) United States Patent
Rosenberg et al.

(10) Patent No.: US 8,194,642 B2
(45) Date of Patent: Jun. 5, 2012

(54) SYSTEM AND METHOD FOR PROVIDING MULTIMEDIA SERVICES

(75) Inventors: Jonathan D. Rosenberg, Freehold, NJ (US); Flemming S. Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 11/556,977

(22) Filed: Nov. 6, 2006

(65) Prior Publication Data

US 2008/0126541 A1 May 29, 2008

Related U.S. Application Data

(60) Provisional application No. 60/771,513, filed on Feb. 7, 2006.

(51) Int. Cl.
*H04L 12/66* (2006.01)
(52) U.S. Cl. .......................... 370/352; 709/223; 709/225
(58) Field of Classification Search .................. 370/351, 370/352; 709/223, 225, 226
See application file for complete search history.

(56) References Cited

U.S. PATENT DOCUMENTS

| | | | |
|---|---|---|---|
| 6,332,163 B1 | 12/2001 | Bowman-Amuah |
| 6,339,832 B1 | 1/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,615,199 B1 | 9/2003 | Bowman-Amuah |
| 6,615,253 B1 | 9/2003 | Bowman-Amuah |

(Continued)

FOREIGN PATENT DOCUMENTS

WO 2004/086800 10/2004

(Continued)

OTHER PUBLICATIONS

Notification of Transmittal of the International Search Report and the Written Opinion of the International Searching Authority, or the Declaration, International Application No. PCT/US07/03403, 12 pages, Mailed Dec. 4, 2007.

(Continued)

*Primary Examiner* — Jung Park
(74) *Attorney, Agent, or Firm* — Baker Botts L.L.P.

(57) ABSTRACT

In certain embodiments, the present invention comprises a system and method for providing feature services in a multimedia communication environment. The system and method comprise comparing signaling messages with control data to identify one or more service enablers and application servers that are responsive to the signaling message. Each responsive service enabler is invoked in accordance with an associated policy hook.

43 Claims, 3 Drawing Sheets

U.S. PATENT DOCUMENTS

| | | | |
|---|---|---|---|
| 6,636,242 | B2 | 10/2003 | Bowman-Amuah |
| 6,640,238 | B1 | 10/2003 | Bowman-Amuah |
| 6,640,244 | B1 | 10/2003 | Bowman-Amuah |
| 6,687,339 | B2 | 2/2004 | Martin |
| 6,715,145 | B1 | 3/2004 | Bowman-Amuah |
| 6,742,015 | B1 | 5/2004 | Bowman-Amuah |
| 6,789,252 | B1 | 9/2004 | Burke et al. |
| 6,842,906 | B1 | 1/2005 | Bowman-Amuah |
| 6,980,962 | B1 | 12/2005 | Arganbright et al. |
| 7,020,697 | B1 | 3/2006 | Goodman et al. |
| 2002/0062379 | A1 | 5/2002 | Widegren et al. ............. 709/227 |
| 2003/0088765 | A1* | 5/2003 | Eschbach et al. ............. 713/150 |
| 2004/0073928 | A1 | 4/2004 | Alakoski et al. ................ 725/62 |
| 2005/0041584 | A1 | 2/2005 | Lau et al. ...................... 370/235 |
| 2005/0278447 | A1 | 12/2005 | Raether et al. ................ 709/227 |
| 2007/0060124 | A1* | 3/2007 | Kalavade ....................... 455/433 |
| 2007/0201665 | A1* | 8/2007 | Kocan et al. ............. 379/201.02 |
| 2008/0013533 | A1* | 1/2008 | Bogineni et al. .............. 370/389 |
| 2008/0037747 | A1* | 2/2008 | Tucker .................... 379/201.12 |
| 2008/0108373 | A1* | 5/2008 | Agarwal et al. ........... 455/456.6 |
| 2008/0144637 | A1* | 6/2008 | Sylvain et al. ................ 370/401 |

FOREIGN PATENT DOCUMENTS

WO    WO 2005/055549    6/2005

OTHER PUBLICATIONS

State Intellectual Property Office of the People's Republic of China, The First Office Action and Text of the First Office Action, Application No. 200780004639.5, dated Dec. 1, 2010, forwarded by foreign associate to Baker Botts on Mar. 3, 2011; 7 pages.

European Patent Office, "Communication," Application No. 07763430.1-2413/1982460, PCT/US2007003403, Jan. 12, 2012, 12 pages.

Nicholas M. DeVito et al., "Functionality and Structure of the Service Broker in Advanced Service Architectures," XP-002665093, Bell Labs Technical Journal 10(1), 17-30, 2005, 14 pages.

IP Multimedia Subsystem (IMS), "3rd Generation Partnership Project; Technical Specification Group Services and System Aspects; IP Multimedia Subsystem (IMS); Stage 2, (Release 7)," Dec. 1, 2005, pp. 1-192, Jun. 16, 2005.

\* cited by examiner

SYSTEM AND METHOD FOR PROVIDING MULTIMEDIA SERVICES

CROSS-REFERENCE TO RELATED APPLICATIONS:

This application claims priority under 35 U.S.C. §119 of provisional application No. 60/771,513 filed Feb. 7, 2006 and entitled "IMS-Based Framework".

TECHNICAL FIELD OF THE INVENTION

This invention relates in general to communication systems, and more particularly to a system and method for providing multimedia services.

BACKGROUND OF THE INVENTION

In today's cellular architectures, it is difficult and expensive to introduce new services. The difficulty and expense may be attributed in large part to the monolithic architecture of switching centers, which do not allow for services to be introduced outside of the switch itself.

The IP Multimedia Subsystem (IMS) architecture addresses these limitations to some extent. According to current standards, an IMS architecture provides features to users through external application servers. An initial Filter Criteria (iFC) defines a set of Service Point Triggers (SPTs) to determine if a request should invoke a particular application server.

The IMS architecture, however, provides only limited capabilities through SPTs. Often, these SPTs are insufficient to provide advanced and efficient support for new terminal types and new services enabled by those terminals, such as presence, streaming video, and the like.

Thus, to facilitate the deployment of advanced features and new services, telephony developers need a platform that is flexible and not designed solely on existing and well-known capabilities and services. In particular, the shift from traditional cell phones to more sophisticated types of access terminals with richer user interfaces, improved processing and memory, and new types of media capabilities must be taken into account.

SUMMARY OF THE INVENTION

In accordance with the present invention, the disadvantages and limitations associated with traditional IMS SPTs have been substantially reduced or eliminated. In particular, limitations associated with implementing and deploying new multimedia services have been reduced or eliminated.

One embodiment of the present invention comprises a method for providing feature services in a multimedia communication environment. The method comprises receiving a signaling message and running one or more scripts to compare the signaling message with control data to identify one or more service enablers or application servers that are responsive to the signaling message. Each responsive service enabler then is invoked in accordance with an associated policy hook.

In accordance with another embodiment of the present invention, a multimedia communication system is provided. The system comprises one or more service enablers, a policy hook associated with each service enabler, application servers, and a processing component. The processing component is operable to run one or more scripts to compare a signaling message with control data to identify one or more of the service enablers or application servers that are responsive to the signaling messages, and invoke each responsive service enabler or application server in accordance with the associated policy hook.

In accordance with another embodiment of the present invention, an Application Control Point (ACP) for use in a multimedia communication system is provided. The ACP is a network element responsible for enabling and providing services to users of the system. The ACP comprises a signaling protocol interface, a programmable flow engine, a rules engine, one or more service enablers, and one or more policy hooks associated with each service enabler. The rules engine is operable to match expressions in input data. The programmable flow engine is operable to process signaling messages received through the signaling protocol interface, to interact with the rules engine to compare the signaling messages with control data, and to interact with one or more service enablers or application servers to provide multimedia communication features responsive to the signaling messages. The policy hooks are externally configurable and control the operation of the service enablers.

In accordance with yet another embodiment of the present invention, an access terminal for use in a multimedia communication system is provided. The access terminal is a piece of user equipment providing services to the user. The access terminal comprises a signaling protocol interface, a programmable flow engine, a rules engine, one or more service enablers, and one or more policy hooks associated with each service enabler. The rules engine is operable to match expressions in input data. The programmable flow engine is operable to process signaling messages received through the signaling protocol interface, to interact with the rules engine to compare the signaling messages with control data, and to interact with one or more service enablers to provide multimedia communication features responsive to the signaling messages. The policy hooks are externally configurable and control the operation of the service enablers.

Important technical advantages of certain embodiments of the present invention include enabling the implementation of additional multimedia services without hard-coding additional logic in the Application Control Point or the Access Terminal. This, in turn, may facilitate rapid development and deployment of new services without incurring excessive communication with external application servers.

Other important technical advantages of certain embodiments of the present invention include enabling application server vendors to develop new features, services, or logic independently of an application control point (ACP) vendor. Any application server vendor may define and implement a new application server, and the service provider may provide new control data to an ACP to invoke them accordingly. Moreover, the need for software upgrades to an ACP when new services or features are introduced is substantially reduced or eliminated.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

The present invention provides, among other things, a network core that provides a general framework that may accommodate new types of access terminals with new capabilities and services not yet envisioned. In a preferred embodiment of the invention, the central components of the framework do not have to be upgraded every time new capabilities and service come along.

Figure 1:
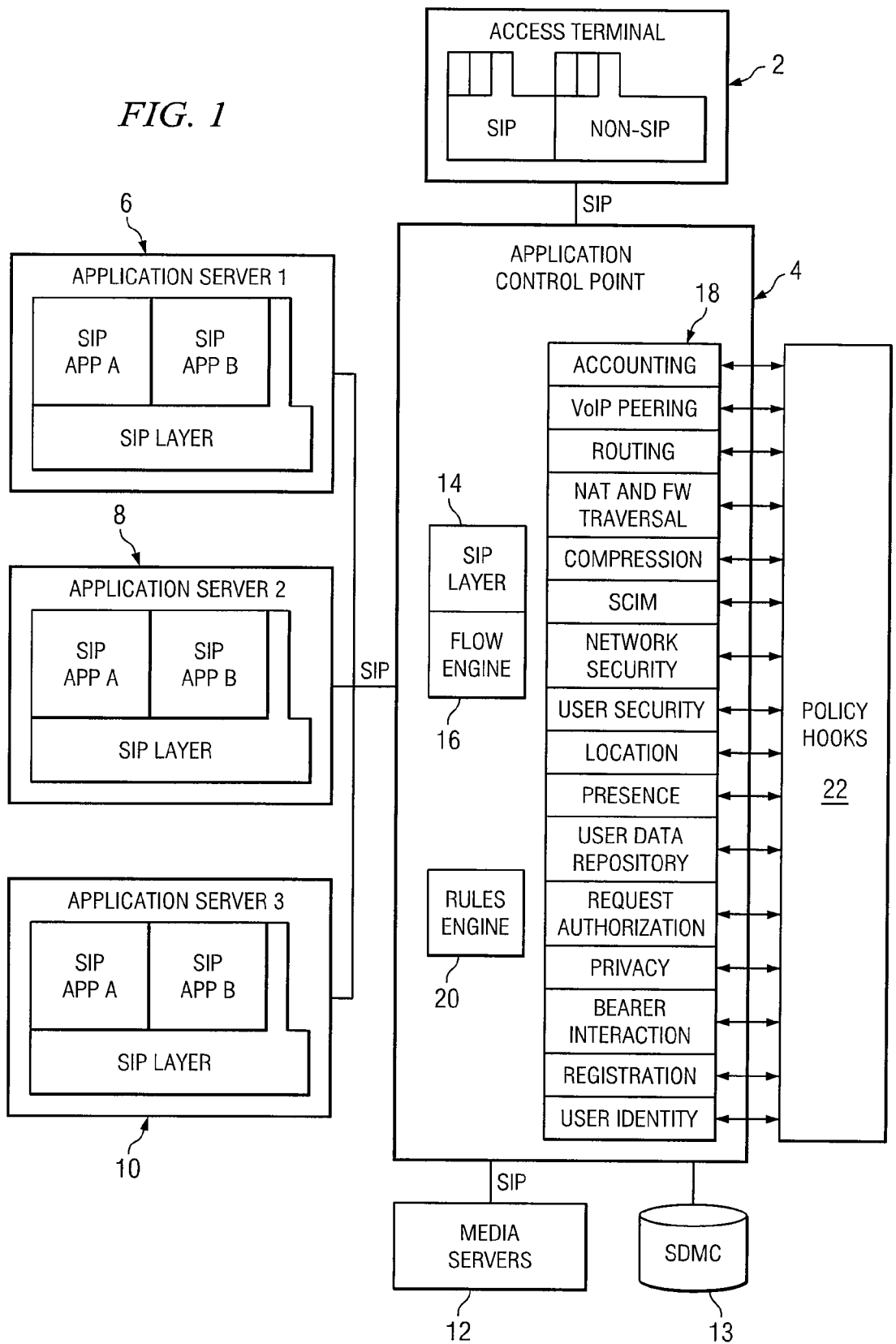
FIG. 1 is a simplified component diagram that illustrates a framework of one embodiment of the present invention.

FIG. 1 is a simplified component diagram that illustrates a framework of one embodiment of the present invention. The framework of FIG. 1 includes an access terminal 2, application control point (ACP) 4, application servers 6, 8, 10, and media servers 12. ACP 4 may also be coupled to a services data management center (SDMC) 13, which serves as a central subscriber data repository. Access terminal 2 and ACP 4 both are designed around several important concepts. First, a signaling protocol layer 14 with a general and programmable flow engine 16 determines how the framework processes signaling messages. In certain embodiments, the signaling protocol is the Session Initiation Protocol (SIP). Certain features of the invention are described below with reference to this particular signaling protocol, but other well-known protocols may be substituted without departing from the scope of the invention. Flow engine 16 interacts with one or more service enablers 18 to perform various service-enabling functions. Second, a rules engine 20 performs matching operations between a set of input data (e.g. a SIP message) and a set of control data (e.g. a message filter criteria), and decides if a match exists or not (i.e. if the input data includes identifiable control parameters). Thirdly, policy hooks 22 are associated with service enablers 18. Policy hooks 22 may be configured and controlled externally, and in turn control the operation of service enablers 18.

Rules engine 20 performs regular expression matching operations on both messages and data. Flow engine 16 in turn supports a high-level scripting language to control its operation. As part of that operation, flow engine 16 may use rules engine 20 to perform matching operations on a message to determine how the message should be handled. For example, a user identity service enabler (described in greater detail below) may indicate whether user authentication for a particular request succeeded, and flow engine 16 may be programmed to take action accordingly (e.g. reject the request unless it was for an emergency call).

In certain embodiments of the present invention, the matching operations supported by rules engine 20 may include: regular expression matching on SIP messages (requests and responses); regular expression matching on provisioned data and dynamic data stored in the Services Data Manager (SDMC) 13, as well as parsing of extensible markup language (XML) documents with element selection and regular expression matching on the element content; regular expression matching on tokens (application descriptors, which are textual tokens that are being associated with a signaling message in order to identify the underlying application, its constituent media components, and other attributes of potential relevance to the service logic) and data exchanged with service enablers 18; and regular expression matching on data obtained from the underlying system (e.g. time-of-day or time expired) or against document data (e.g. a calendar).

Such matching operations provide a mechanism for programming ACP 4 to operate on data and application descriptors, which allows ACP 4 to provide additional services without hard-coding additional logic. This, in turn, may facilitate rapid development and deployment of new services without incurring excessive communication with external application servers (unlike the current IMS model). Flow engine 16 also allows for matching on responses to requests, in addition to the initial request.

According to certain teachings of the present invention, the scripting language of flow engine 16 enables it to interact with service enablers 18 or application servers 6-10. In certain embodiments, each such service enabler may be identified by a string or token, and data may be exchanged through a well-defined XML format that enables an application to examine a particular element using XPath. Each of the service enablers 18 provides a set of services to ACP 4, and may pass generic tokens and data to and from the flow engine. While scripts and control data govern the operation of ACP 4, the scripts and control data generally are fungible components. A set of scripts may be defined to control the overall operation of ACP 4, and ACP 4 may, in turn, execute them based on signaling messages and control data. The scripts are general scripts that define the overall processing of SIP messages in ACP 4. For example, all incoming SIP messages (regardless of any particular user associated with the message) may require authentication of a user identity, an accounting event, etc.

Thus, there is a significant relationship between users, access terminals, and an ACP from a SIP application layer perspective. Users send and receive requests (e.g., SIP messages) from their access terminal, through ACP 4. ACP 4, in turn, delivers services to the user by invoking service enablers responsive to the requests, and interacting with application servers, media servers, and other external resources as needed to respond to the request.

Generally, a user should be associated with an ACP so that the ACP may receive requests from the user and provide originating services to the user, and so that the ACP may receive requests destined for the user and provide terminating services for the user. In one embodiment of the present invention, an ACP in a user's home provider network is selected dynamically if a user registers and an ACP is not already assigned. The selection may be based on any number of factors, including the user's physical proximity to an ACP. If the user registers additional access terminals, each will register with the same ACP. Thus, services in such an embodiment are controlled by a single ACP.

Figure 2:
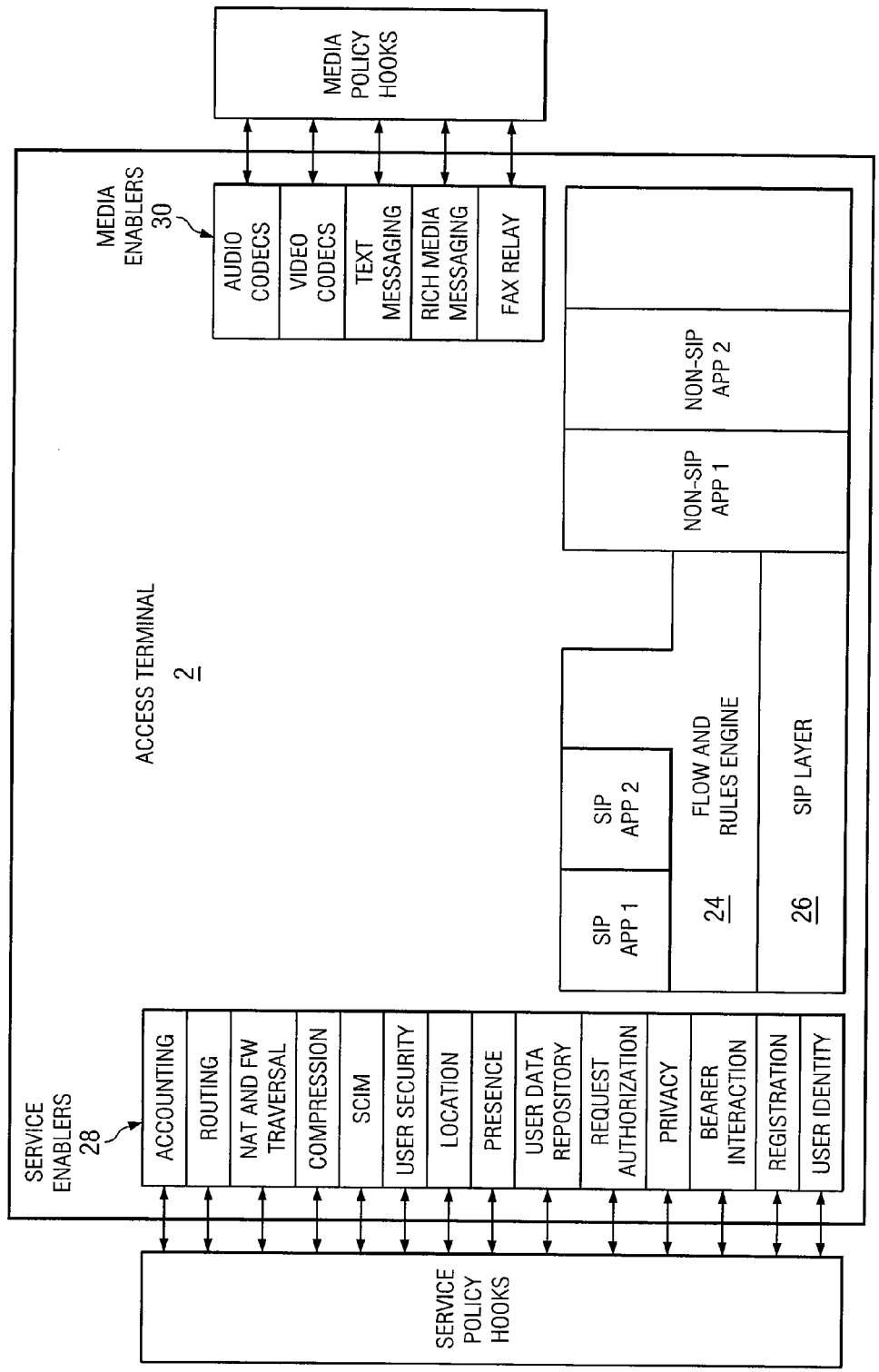
FIG. 2 is a simplified component diagram that illustrates one embodiment of an access terminal in which certain teachings of the present invention may be practiced.

FIG. 2 is a simplified component diagram that illustrates one embodiment of an access terminal in which certain teachings of the present invention may be practiced. As illustrated in FIG. 2, the application framework design of access terminal 2 is similar to that of ACP 4. Such an application framework on access terminal 4 allows for different services to be implemented on an access terminal in a generic, non-monolithic manner.

As shown in FIG. 2, access terminal 2 may have a flow engine 24, a rules engine 26, and a set of service enablers 28 that facilitate the development and deployment of access-terminal-based SIP applications, by making the capabilities of service enablers 28 available to applications running on access terminal 2. This framework enables new SIP applications to be developed quicker and more easily on an access terminal by taking advantage of the general capabilities provided by service enablers on the access terminal. Non-SIP applications may be running on the access terminal as well. These applications may be either independent of the SIP applications, or they may invoke the services of a SIP application. For example, a game application may use SIP services to establish a voice session between the game participants.

Service enablers 18 and 28 provide general functions or capabilities that facilitate the development of a variety of applications. The set of service enablers in an ACP and an AT generally is the same, but specific functions may differ. In ACP 4, for example, service enablers 18 facilitate the deployment of network-based applications by making functions available to an application server as well as ACP 4 itself.

In certain embodiments, a service enabler may be directly available to ACP 4 and application servers 6-10 (e.g., presence information), or it may represent functionality that application servers 6-10 would otherwise have to provide if not provided by ACP 4 (e.g., authenticated identity). Service enablers 18 thus represent a set of functions that may be used as building blocks to provide new services based on rules and control data.

According to certain teachings of the present invention, ACP 4 may support a set of basic services via flow engine 16 and service enablers 18, whereas external application servers 6-10 may provide more enhanced and sophisticated services. ACP 4 generally operates on a SIP message, interacts with service enablers 18, and as a result of that, may invoke zero, one, or more external application servers 6-10. ACP 4 generally invokes application servers 6-10 via SIP and an IMS ISC interface with enhancements to address dynamic feature interaction (described later).

Figure 3:
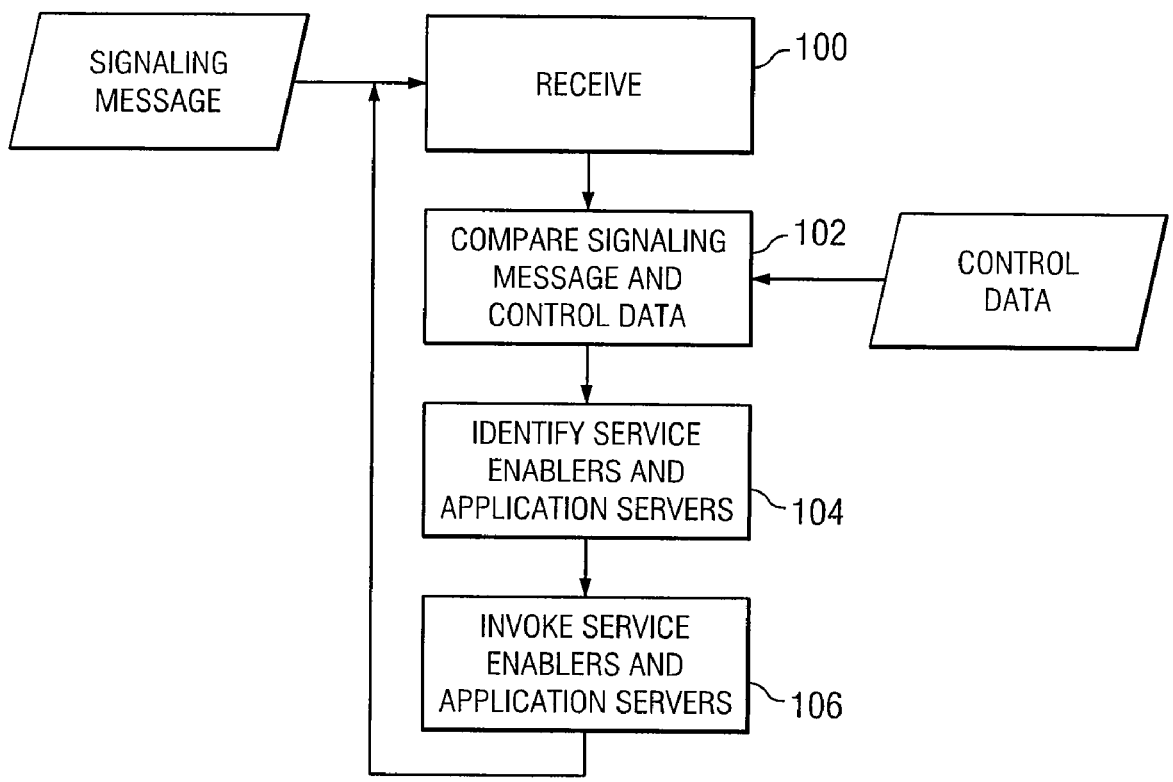
FIG. 3 is a flowchart of an example operation of one embodiment of the present invention.

FIG. 3 is a flowchart of an example operation of one embodiment of the present invention. In step 100, flow engine 16 receives a signaling message or other input data. Flow engine 16 is provided with a set of scripts and matching criteria that govern the processing of the signaling message, including which service enablers and application servers to invoke. In certain embodiments, a script or scripts associated with flow engine 16 compares attributes or contents of the signaling message to control data (step 102), and may invoke rules engine 20 to search for expressions within the signaling message. Control data may represent a variety of data, including the value of a signaling response messages (e.g., a "busy" response); provisioned data (e.g. service provider policy), dynamic data stored in or available to ACP 4 (e.g. registration status of a called user), data in XML format (where individual elements may be examined through XPath expressions), or data obtained from an underlying operating system (e.g. time of day) or external application (e.g. a mail filtering application).

For example, a user may store a contact list (i.e. a "buddy list") in an XML document accessible to flow engine 16. If flow engine 16 receives a message from a sender not identified in the contact list, flow engine 16 may reject the message. Conversely, if the message is from a sender in the contact list, flow engine 16 may invoke a particular service enabler to authorize a media stream. In this example, the message represents the input data, while the contact list represents the control data. A script or scripts within flow engine 16 govern how the control data affects the message.

In another example embodiment, a service provider or user may set a policy or preference for processing messages based on the time of day. In this example, flow engine 16 need not compare the contents of any messages with control data. Rather, flow engine 16 merely compares the timestamp (or other attribute) of a message with control data (represented by policy or preference data), and acts according to the timestamp. For instance, flow engine 16 may redirect all messages received after 10:00 p.m. to a media server to play a prerecorded audio message. Here, the policy or preference represents the control data. And, again, the message represents the input data in this example. The contents of the message itself do not affect the operations of flow engine 16, though. Rather, it is an attribute (the timestamp) of the message that triggers a certain action. Alternatively, flow engine 16 may take a similar action based on the system time, without obtaining the message timestamp.

Through the scripts, flow engine 16 interacts with service enablers and determines which application servers to invoke, if any, to provide a certain feature or service (step 104).

Finally, flow engine 16 invokes each responsive service enabler or application server to provide the feature or service (106). The operation of each such service enabler is governed by an associated policy hook, which is externally configurable and may be provisioned per subscriber.

It is important to note that ACP 4 generally is not cognizant of the actual services and applications being executed (i.e., the actual service logic for a particular service may not be inherently built into ACP 4). Rather, ACP 4 is provided with a set of scripts and control data that control the processing flow and determine which application servers to invoke (and in which order). By not hard-coding specific processing flows and service logic in ACP 4, new flows and services may be introduced by providing ACP 4 with new scripts and control data, and introducing new application servers. In conjunction with this, service enablers 18 provide a powerful set of building blocks that facilitate the rapid development and introduction of new services by providing a set of core capabilities available to ACP 4 and application servers 6-10.

There are numerous advantages to this framework. For example, application server vendors are not dependent on the ACP vendor to develop new flows or logic. Any application server vendor may define and implement a new application server, and the service provider may provide new control data to ACP 4 to invoke them accordingly. As another example, the need for software upgrades to ACP 4 when new flows or services are introduced is substantially reduced or eliminated.

Another advantage of this framework is that it enables diverse and sophisticated processing flows in ACP 4. In particular, certain embodiments may include a flow engine and a service capabilities interaction manager (SCIM) service enabler (described below) that operate on provisioned and dynamic data, as well as tokens passed to and from service enablers, which enables more sophisticated flows within an ACP without hard-coding the flows into the ACP. This, in turn, may enable more intelligent interaction with external application servers (e.g., by avoiding invoking an application server for a feature that is not active). User-specific rules may be provided to a SCIM service enabler as well.

A service capability interaction manager (SCIM) service enabler provides user-specific processing of SIP messages. In particular, a SCIM may operate based on a user's profile, including services subscribed to and features activated, and invoke relevant service enablers and external application servers accordingly. For example, it may use a bearer interaction service enabler (described below) to enable Quality of Service (QoS) for sessions that require it.

A SCIM also may include a scripting language similar to that of an ACP flow engine, the operation of which may be governed by signaling messages, control data, and matching operations performed by a rules engine. A SCIM may maintain and operate on dialog state in an application-agnostic manner by interpreting the scripting language and interacting with rules engine 20 to operate on signaling messages or events.

Moreover, a SCIM generally knows that there is a dialog and has access to various state information associated with a dialog, such as dialog ID, dialog state, dialog duration, and the like. Thus, a SCIM may perform dialog stateful feature processing. For instance, maintaining dialog state may allow a SCIM to limit a particular user or access terminal to only two simultaneous calls. Dialog state may be maintained in an application agnostic manner. A SCIM also may associate tokens with a dialog that identifies a dialog type (e.g., push-to-talk or "ptt"), features invoked (e.g., "CFNA"), bearer interactions ("audio," "video," etc.) and any other type of information that may be of importance to subsequent processing. According to certain teachings of the present invention, these tokens may be simple "strings" on which a SCIM may perform general matching operations. A SCIM may determine which token to associate via expression matching operations (e.g. regular expressions) on input data, such as a media line in a signaling message. Using string tokens avoids hard-coding of features and other capabilities in a SCIM, while at the same time enabling a SCIM to be programmed with feature interaction and feature invocation aware logic based on these tokens.

A SCIM also may operate on static and dynamic user data (e.g., a buddy list or presence data). In embodiments having a scripting language, a SCIM may process decisions to be made based on the contents of such data. In particular, a scripting language (and a rules engine) may support the use of XPath, which allows for one or more data elements in an XML document to be retrieved based on position in document, type, content, etc. XPath may be used, for example, to determine if a calling party is in a user's buddy list, and if so let the call proceed, or if not, divert it to voice-mail.

A SCIM generally follows the principle of avoiding hard-coded application logic in an ACP. According to teachings of the present invention, a SCIM may avoid hard-coded logic through its generic scripting language, which controls the operation of a SCIM. In certain embodiments of the present invention, scripts may be included in a user's profile. Scripts in user profiles generally should not include excessive application logic, but rather control the overall operation of user features, and interaction between those features. Consequently, scripts should invoke application servers, which provide the enhanced feature logic.

Moreover, in certain embodiments of the present invention, a SCIM has the capability to examine a user's profile data to understand the activation status of various features. Understanding a feature's activation status may allow a SCIM to avoid unnecessarily invoking application servers. For instance, if a feature requires invocation of an external application server, a SCIM may invoke the application server only if a user activated that particular feature (e.g., Call Forward No Answer). This provides for a considerably more efficient system (less delay and overall processing) than provided by the IMS Initial Filter Criteria, which can only perform matching operations on SIP messages.

Since a SCIM is a service enabler that generally invokes user-specific features, one function of a SCIM is to resolve feature interaction between such features. Static feature interactions, for instance, may be resolved by evaluating a user's filter criteria in a defined order, while dynamic feature interactions may be resolved through extended signaling capabilities such as media feature tags and feature override indicators. A feature override indicator may be, for example, a token added by an application server that causes a SCIM to operate differently than it otherwise would have. A SCIM also may use its knowledge of dialog state to resolve feature interactions, and in some cases even override an operation taking place on an endpoint. For example, in case of an emergency, a SCIM may tear-down or suspend calls on an access terminal and then present the emergency information (e.g., adverse weather information) to a user.

ACP 4 also may include a number of additional service enablers, including service enablers for user identity, registration, bearer interaction, privacy, request authorization, user data repository, presence, location, user security, SIP infrastructure security, SIP compression, NAT and firewall traversal, request routing, VoIP peering, and accounting. In general, a policy hook is associated with each such service enabler. These example service enablers are merely illustrative and not exclusive, and each is described in greater detail below.

A user identity service enabler provides user authentication and associated user identity assertion functions, which generally happens as part of the originating service processing. Each user has a private user identity, which is used to identify the particular user. Associated with a private user identity are one or more public user identities, which serve two purposes. First, a public user identity is an identity the user is allowed to assert, and which will be used to identify the user throughout the rest of the system. Second, the public user identity is a name that can be used to reference the user and to which future sessions or requests can be directed. The user is allowed to suggest a public user identity to assert, but if none are suggested, one of them may be asserted for him. Once a user's private identity has been authenticated, and a valid public identity has been provided, the ACP provides the asserted identity in further signaling messages going to other entities in the system (e.g., application servers such a voice-mail). This alleviates those other entities from having to authenticate the user. The ACP effectively performs a "single sign-on" operation for a user in an application domain. The actual user authentication process may be performed using HTTP digest, where the ACP interacts with a Security Center for the credentials.

An asserted user identity may be provided in two different ways. The first simply places the asserted identity in a header and relies on transitive trust among all elements in the system. The other (more secure) method requires the ACP to digitally sign the identity asserted by the user (assuming successful authentication), thereby avoiding the inherent weaknesses of the transitive trust model.

Asserting a particular identity for a user works well from an authentication point of view, but it has some inherent practical limitations when it comes to using those identities for authorization purposes. For example, users may want to limit who has access to their presence status, and calls from certain types of users (e.g., operators) or applications (network-based services) should be allowed to bypass normal processing rules and user preferences. All of this involves an authorization decision.

The user identity service enabler also supports the concept of trait-based authorization. With trait-based authorization, users have one or more traits or attributes associated with them. A trait can, for example, be "operator," or "over-21." When a user has been authenticated, the network asserts the traits associated with that user, and the traits asserted then may be used for subsequent authorization decisions. For example, if an "operator" calls the user, normal terminating feature processing may be overridden, or a user that is not "over-21" may not be permitted to access certain services or content, etc. The user identity service enabler supports assertion of these traits as well.

The user identity service enabler also may play a role during terminating service processing. When the ACP receives a request targeted to one of its users, the user identity service enabler may ensure that any identity information provided in the message is authentic. In the transitive identity trust model, this implies a need to remove any identity information provided by a previous hop that is un-trusted. When identities instead are signed digitally, the signature is verified. If the signature is invalid, further disposition of the request is up to the provider and user's policy. The identity may not be used for any subsequent authorization decisions, but instead must be treated as unavailable.

The policy hooks associated with a user identity service enabler may include the public user identities a particular private user identity can assert, an indication of which public user identity is the default public user identity, a preferred method of indicating the user identity (transitive trust, digitally signed, or both), the traits associated with a particular user (which may be used for trait-based authorization), and disposition of requests without a valid identity. In one embodiment, the user-specific policy hooks may be stored as part of the user's profile.

A registration service enabler provides functions that facilitate registering an access terminal with a network. When a user starts SIP service on an access terminal, the user needs to register the access terminal with the network. Specifically, the user registers a binding between one or more public user identities and the access terminal. The registration service enabler is involved in this process. A private user identity may be associated with one or more public identities, and it is one of these public identities that may be registered. As a side-effect of registering a public identity, one or more associated public identities may be registered automatically as well. This is known as an "implicit registration set." The registration service enabler may perform this implicit registration automatically.

The registration service enabler also may be responsible for maintaining and managing the registration bindings. Registrations generally have a finite lifetime associated with them and when they expire, the registration service enabler generates an event internal to the ACP. The ACP, in turn, may take action on this event.

Similarly, registrations can be removed forcefully. The registration service enabler may have an external interface through which management related registration requests may be exchanged (e.g., deregistration, or forced re-registration). In particular, the registration service enabler may be asked to forcefully deregister all access terminals for a particular user, in which case the registration service enabler removes the particular user's registration bindings and generates an event internal to the ACP. The ACP, again, can take action on this event (i.e., to force tear-down of any sessions that user has).

Access terminals include a variety of devices and systems, such as cell-phones, PDAs, laptops, etc., and hence have different capabilities and applications. When a user registers an access terminal, the user agent capabilities of the access terminal may be conveyed to the network in the form of "feature tags." As new applications and features are added to the access terminal, and old ones are potentially removed, the set of feature tags supported by the access terminal changes. Examples of feature tags include: supported media types (e.g., audio, video, text); supported SIP methods and event packages; and specific supported applications (e.g., push-to-talk).

The potential set of feature tags conveyed may be quite large, and new ones will likely continue to be created. It is therefore advantageous that features are not hard-coded into the ACP. In accordance with certain teachings of the present invention, the registration service enabler provides such an advantage by treating the feature tags as opaque strings of feature tag data, upon which the ACP can operate.

When users register and indicate a certain set of feature tags, they are indicating that they are capable of receiving requests for certain classes of media, applications, etc. Users, however, may not be authorized to use all media types and applications, but rather a limited set of features to which they subscribe. Those feature authorization policies may be enforced when the feature tags are registered, or when services are invoked (only authorized services would be allowed). According to certain teachings of the present invention, the registration service enabler may support this enforcement by associating only the feature tags authorized for the registered user with the device. The set of authorized feature tags for a user is provisioned as part of the user profile and may be updated.

Registration events also may be of interest to external entities. Consequently, the registration service enabler may notify other SIP entities of registration events.

Finally, the registration service enabler may interact with an SDMC to identify an ACP that is currently assigned to a user. This, in turn, enables incoming requests for that user to be routed correctly.

Policy hooks associated with the registration service enabler may include implicit registration set associated with a user, authorized capabilities associated with a user, external stimulus, network initiated registration actions (e.g., deregistration or re-registration), and updates to authorized capabilities associated with a user.

A bearer interaction service enabler facilitates policy and resource interactions with a bearer layer to obtain network resources for media streams. A bearer interaction service enabler may derive the following information and provide it to a policy server: user identity; desired accounting policies (e.g., online or offline) and parameters (e.g., destination for accounting parameters, correlators); application name; types of media streams (audio, video, etc.); packet classifiers (IP-address, port, transport protocol); and bandwidth requirements.

A user identity is an identity of a responsible user, which may be obtained from a user identity service enabler.

Accounting information may include the type of accounting (e.g., online or offline), as well as the address of an accounting server.

When bearer interaction is needed to satisfy a given request, a bearer is requested in the context of a particular application. Applications have names associated with them, such as "PTT" for Push-To-Talk, or "VTel" for a video telephony call. Such names are generic strings ("tokens") assigned by a service provider and provided to a policy server function when a policy request is made. In order to determine the application name for a particular request, a bearer interaction service enabler uses a high-level scripting language and the general capabilities of a rules engine to perform application classification by performing regular expression matching on requests against a configurable set of control data used for application classification. Application names and associated semantics generally are not hard-coded in an ACP. Rather, an ACP may have a generic and programmable way of determining them based on regular expression matching of a rules engine.

Media stream types may be determined in a similar way. For instance, an SDP is inspected for media stream types indicated in the SDP. However, a programmable media stream classification function using a high-level scripting language and a rules engine may be used as well.

Similar logic may apply to determining packet classifiers, which typically operate on well-known SDP parameters. Packet classifiers may also be configured to look for additional parameters as well, some of which may be new.

Finally, bandwidth requirements for a media stream should be determined. Bandwidth requirements depend on the codec(s) used, and an SDP is inspected by a bandwidth determination function, which also may be configurable and may use a high-level scripting language and a rules engine to enable new codecs without incurring the need to upgrade an ACP.

According to certain teaching of the present invention, a bearer interaction service enabler feeds these parameters into a policy server. A bearer interaction service enabler may also make them available to other service logic as well (e.g., they can be used as parameters by the SCIM).

The bearer interaction service enabler interacts with a policy server through generic tokens. Tokens from the policy server may be either received in response to a request (e.g., a policy request), or they may be generated autonomously by the policy server in response to an external event (e.g., terminal roamed from EVDO to 1xRTT, terminal not reachable, idle terminal). An ACP, in turn, may be programmed to take action on these received tokens. For example, if a SCIM invoked the bearer interaction service enabler and it receives a "bearer.authorized" response, it may proceed with processing the request. If, however, it receives a "bearer.unauthorized" response, it may instead invoke an announcement server.

Accordingly, policy hooks provided for the bearer interaction may include control data and associated application identifiers for application classification, control data and associated media stream identifiers for media stream classification, control data and associated packet classifier identifiers for the packet classification, control data and associated bandwidth determination for bandwidth determination, and data for accounting and an accounting server.

A request authorization service enabler may be responsible for authorizing originating and terminating requests. In this context, "originating requests" generally are requests placed by a user and received by an ACP (e.g., a call made by the user), and "terminating requests" generally are requests targeted to a user that arrive at an ACP (e.g., a call to the user). When a request arrives at an ACP, it should compare the request with one or more authorization policies to determine if the request may proceed.

There are multiple aspects to consider for request authorization policies, including the scope of an authorization policy (e.g., operator-wide or user-specific), authorization to use particular SIP services, applications, and media servers, authorization to send requests to certain destinations (e.g., make a long distance call, or send an instant message to a user of another provider), and authorization for a remote user or entity to subscribe to a local user's presence, location, or call information. Such policies are merely examples of possible authorization policies, and the potential list of potential policies and the input parameters used to determine if a particular authorization is satisfied or not may be limitless.

Moreover, a particular class of authorization polices associated with bearer services generally is covered by a bearer interaction service enabler, while a policy server actually provides specific authorization.

A user data repository service enabler provides access to several types of user data, including user profile data, static repository data, and dynamic repository data.

User profile data may be provisioned and stored in the SDMC and may be retrieved by the ACP when a user first registers. If changes are made to user profile data, a user data repository service enabler may notify an ACP of those changes. User profile data may include information about a user and various authorization policies associated with him, such as user identity information (e.g., private/public identities and traits), registration-related information (e.g., implicit registration sets and authorized terminal capabilities), request authorization information (e.g., services subscribed to), and user specific filter criteria to control and invoke services for the user.

Static repository data generally includes data that needs to be retained for some duration. An ACP may obtain and cache such data from the SDMC as needed, and may make it available to itself and authorized application servers. If an ACP or an application makes any changes to such data, the ACP may update a master copy of the data in the SDMC. Static repository data may be provided and managed either by an ACP or by one or more application servers. If the data is useful to multiple applications or used by a service enabler, it may be managed by an ACP. This type of data is referred to herein generally as "structured data." A "buddy list" is an example of structured data. Structured data may have a name (e.g., "buddylist") and a well-defined structure associated with it (e.g., an XML schema). Such attributes allow service enablers and applications to reference (obtain a copy) and operate on structured data in a coherent manner. In contrast, static repository data that may be useful only to a particular application is referred to generally as "transparent repository data." Structure associated with transparent repository data may be known only to a specific application server. Transparent repository data also may have a name associated with it (e.g., "app1.data1").

Both structured and transparent user data repository data may be obtained, cached, and updated by an ACP via interactions with the SDMC. If data is accessed by an application server, an ACP may serve as a "funnel" for the SDMC access on behalf of the application server. Alternatively, a service provider's application servers may access the SDMC directly.

Finally, data that may not need to be retained is referred to generally as "dynamic repository data." Dynamic repository data may be available on an ACP only; the SDMC may never have access to dynamic repository data. Dynamic repository data allows an ACP to store dynamic data internally. In certain embodiments, dynamic repository data may be directly accessed only by an ACP. In such an embodiment, an external entity may rely on standard SIP mechanisms to access the data. For example, presence data may be obtained via SUBSCRIBE, and registration data via a REGISTER query or registration-event.

Policy hooks associated with a user data repository service enabler control which application servers have access to what user data repository data, as well as the level of access (e.g., read, write, add element, delete element, etc.).

A privacy service enabler provides functions associated with several forms of privacy, including identity privacy and IP address privacy.

Identity privacy ensures that user identity information is not provided to an un-trusted entity. For example, if user identity is provided in a separate header without any integrity protection (transitive trust model), then the header may be removed prior to forwarding the request to an untrusted entity. Alternatively, if user identity is provided by an ACP digitally signing the identity asserted by an access terminal, the originating ACP must ensure that the identity asserted is unintelligible to all un-trusted entities. This may be achieved by encrypting the user identity with a key that is well-known only to entities within the trust boundary.

IP address privacy is the privacy of an access terminal's signaling address and its media stream address (es). An access terminal's signaling address and media stream address (es) may not be revealed to un-trusted entities (such as another access terminal). This in turn implies that both signaling and media may need to be relayed through an intermediary. Again, in the transitive trust model this may be achieved by sending the request through a SIP Back-to-Back user agent with an associated media relay. If user identity is digitally signed, however, an ACP must ensure that the intermediary is inserted before the request and accompanying (private) user identity is digitally signed. Alternatively, the access terminal may take part in the IP-address privacy service by invoking a media relay and obtaining anonymous GRUUs (which identify only the assigned ACP to other parties, not the actual user) from an ACP. An ACP privacy enabler in turn may provide the anonymous GRUU function.

A presence service enabler supports the collection, composition, and delivery of presence information by acting as the focal point for connecting sources of presence information (e.g. user endpoints), and interested parties, referred to herein as "watchers." An addressable entity for presence is referred to herein as a "presentity." In some systems, a presentity is a user, which is addressed by a public user identity or address-of-record (AOR). A presence service enabler manages presence data for presentities (users) associated with an ACP.

A presence service enabler may obtain presence information in a variety of ways. For instance, sources of presence information may push information to a presence server using the SIP PUBLISH method. The PUBLISH request may be addressed to the presentity, which may result in the request being routed to an ACP associated with that presentity in accordance with normal routing rules. Presence information for a user may be published by some or all of the access terminals registered for that user, but other sources of publication are also possible. For example, when a user registers, a presence service enabler may be informed of the registration. The presence service enabler may then update the user's presence information accordingly.

A presence service enabler may also act as a watcher, using the SIP SUBSCRIBE method to subscribe to presence information available elsewhere. This is a useful technique for extracting presence information from foreign presence systems. The presence service may also obtain information from other types of systems, such as calendars, location servers, etc., and combine the information to infer presence states or provide richer and more accurate presence information.

Presence information may include information about the capabilities of a user's endpoint (e.g., support for audio, video). This information may be provided by a user as part of publishing presence information, or it may be derived from the registration procedure. Information about the capabilities of a user's access network and policies associated with that network also may be valuable. If a user is currently on a 1xRTT network that will not allow the user to participate in video calls, for instance, the user's capabilities may be updated accordingly. Use of such information may enable new services, such as calling a user only when available both on a device and a network that supports video (not just audio), indicating availability for Instant Messaging when available on an endpoint that supports IM, etc. Gathering information from different sources as well as different layers (network and application), and composing the information into a coherent view of the user's presence state (including device and network capabilities), enables new types of services.

Presence subscriptions by watchers generally are addressed to a public user identity (AOR) of a presentity, and delivered to an ACP serving the associated user. An ACP manages the dialog for each subscription, and may send a NOTIFY message to the watcher(s) when there is a relevant change in the presence status of the presentity.

Presence information may be sensitive and access to it should be controlled at several levels. For instance, a first level of control may be the subscription level (i.e. whether to accept the presence subscription). A request authorization service enabler may implement this level of authorization. A second level of control may be the information level. Presence information provided to a watcher may be controlled by combining information from multiple sources, possibly adding additional status inferred from the combined information, and then filtering out information that should not be presented to a watcher. The filtering process may be performed based on watcher authorization rules associated with a presentity.

The presence server also may accept subscriptions for information about watchers. Presence clients may use this information to learn when users attempt to subscribe to presence for the first time. With this information, a presence client may alter authorization rules to specify how much presence status should be provided to a particular watcher, if any. Another example involves a presence subscription authorization application server, where an application server subscribes to watcher information. When a previously unauthorized first user tries to subscribe to a second user's presence, the application server learns about this, and may inform the second user of the attempted subscription. The application server may then ask the second user to authorize the subscription, possibly at different information levels, depending on the level of presence detail the second user wants to reveal to the first user (e.g., low, medium, or high). Note that such an application server may provide additional functionality as well. For example, an application server may ensure that only authenticated users can subscribe to presence, and check such requests against certain types of lists (e.g. a "blacklist" of users prohibited from subscribing).

A substantial amount of policy information may be required for the proper operation of the presence service enabler on behalf of a specific presentity. Such policy information may include identities of users permitted to publish presence status, proper combination of status from multiple sources to obtain an overall status of a presentity, identities of users permitted to subscribe to presence status, the scope of presence status for a presentity that may be disclosed to a particular watcher, and identifies of user permitted to manage policy information.

Policy information may be stored for each user in the SDMC and cached by an ACP upon initial invocation of the presence service enabler for that user. Some policy information may be managed by a user, while other policy information may be managed by a service provider. For example, a service provider may allow certain applications or user having certain traits to subscribe to a user's presence status, irrespective of the watcher authorization provided by the user. The policy information managed by a user generally is managed through a presence client. In turn, a presence client interacts with a presence service enabler to manage and update information in the SDMC.

A presence service enabler provides several expansion mechanisms to accommodate new types of presence information. In certain embodiments, for example, a presence service enabler may be able to support new XML schemas, so that new types of presence data may be defined in the form of XML documents. The presence service enabler also may support a programmable scripting language that controls how presence information is compose in order to derive a consolidated view of a user's presence status based on aggregate presence data. And according to certain teachings of the present invention, a presence service enabler may take input from a variety of sources and operate on it in a generic manner. For instance, a presence service enabler may be programmed to operate on a variety of XML schemas. Services that either are driven by presence or take advantage of presence data may be implemented outside the presence service enabler, and in particular in application servers that use presence information to implement services.

A location service enabler supports the collection and distribution of location information associated with users by acting as the focal point for connecting sources of location information, known as Location Generators, and interested parties, known as Location Recipients. An example Location Generator could be a Position Server, and examples of Location Recipients could be individual SIP users and application servers.

A location service enabler provides functions for identifying the physical location of a user. Location information may be required by law or regulation to support emergency service, where the physical location of the user determines the routing of the emergency call. Access to location information, however, also may enable many new types of services. Examples of such services include weather forecast, alerts about current traffic conditions, location-sensitive information services such as finding a restaurant, calling a taxi, etc.

An ACP generally does not determine a user's location, though. Rather, an ACP often relies on one or more "location generators" to tell it about the location of a particular user. A position server is an example of a location generator that can determine the geographical location of a particular access terminal when using 1xRTT or EVDO. Alternatively, an access terminal may be able to inform an ACP of its current location if it contains a GPS receiver. An ACP, in turn, may associate users with access terminals (through registration), and hence may determine the location of a user this way. Determining the location of an access terminal, however, may not be sufficient (e.g. an access terminal is just a router) In that case, a SIP endpoint itself may provide more accurate location information to an ACP.

Access terminals may be using other types of access networks, as well (e.g., WiFi). In such cases, a SIP endpoint may provide its location information to an ACP, or an ACP may interact with an access network to determine the physical location of the SIP endpoint.

Location information may be provided in different forms. For example, location information may include a civic location (such as postal address) or geographic location (such as GPS coordinates). Any form of location information, however, may be provided in the form of an XML document. In one embodiment of the present invention, a location service enabler allows for new XML schemas to be defined. Note that this may enable location information to be used as input to a presence service enabler as well.

A location service enabler generally shares certain attributes with a presence service enabler. For instance, a location service enabler and a presence service enabler may share policy authorization issues such as a need to control and authorize who can provide location(/presence) information for a user, and a need to control and authorize who can access location(/presence) information for a user. Consequently, the strategy for dealing with these issues may be similar for location and presence information. Accordingly, certain embodiments of the present invention may include a set of common policy rules that govern both.

In accordance with certain teachings of the present invention, a location service enabler may not contain any specific service logic. Rather, in some embodiments, a location service enabler may support a programmable scripting language that governs its operation on location information (e.g., to check for authorization of a particular request). Services that either are driven by location information or take advantage of location information may be implemented externally to a location service enabler. In particular, these services may be implemented in application servers that use the location information.

A user security service enabler provides security functions that benefit a user by addressing specific security threats. Signaling integrity and confidentiality, and anti-spam (anti-Spit, anti-IM Spam, etc.) are illustrative of security threats that may be addressed by a user security service enabler. Signaling integrity and confidentiality generally comprise securing the signaling by providing integrity protection and encryption between a SIP client and an ACP. TLS encryption of SIP signaling, which provides integrity protection, mutual authentication (if desired), and encryption, may provide signaling integrity and confidentiality. This generally is performed at the application layer to allow devices that may be transiting unprotected networks, such as 802.11 networks, which are then connected to EVDO networks. It may also provide another layer of security even for those devices that are directly connected to an EVDO network. Certain compression schemes also work well in conjunction with TLS.

"Spam" refers to acts of unsolicited sending of a message in bulk. Spam has become widespread in email systems, and is likely to affect other IP-based communications in the future. Given the ever-changing nature of spam, it is important not to hardcode spam detection logic inside a user security service enabler. Accordingly, certain embodiments of the present invention may implement generic spam detection, while other embodiments may have it provided by an external server that can be updated easily. Example techniques for dealing with spam include content filtering, blacklists, whitelists, consent, reputation systems, limited use addresses, turing tests, computational puzzles, payments at risk, legal action, circles of trust, and central providers.

Additional user security threats may be identified, and new user security threats are likely to appear in the future. To address such new security threats, a user security service enabler may invoke an external server, or a user security server may be extended itself.

A SIP infrastructure security service enabler provides security functions to benefit a network by addressing specific security threats to it. Fraud, and signaling integrity and confidentiality are illustrative of such security threats to a network.

Network security threats may be similar to user security threats, but the target of the threat is network resources such as network bandwidth, network elements (SIP proxies, media servers), and network infrastructure (routers, switches, firewalls).

"Fraud" refers to the unauthorized use of resources, including both SIP resources and network resources. Fraud may be prevented primarily through granting QoS to authorized services, which leaves unauthorized services with only best effort quality over the air and over a wireline network.

Because SIP signaling may traverse unprotected networks, SIP signaling should be encrypted and authenticated. Furthermore, entities that wish to exchange SIP signaling with an ACP should first authenticate successfully, and then be authorized to do so.

A NAT and firewall traversal service enabler provides a keep-alive mechanism between SIP endpoints and an ACP that minimizes processing overhead for messages traversing NATs and firewalls. Furthermore, to assist traversal of some restrictive types of NATs and firewalls, a NAT and firewall traversal service enabler may ensure that traffic is sent from the same source address from which it is received. A NAT and firewall traversal service enabler also may inform a policy server that NAT and firewall traversal should be allowed for appropriate media.

For instance, a SIP endpoint may be behind Network Address Translators (NATs) and firewalls if the SIP endpoint application resides on a laptop and connectivity is provided through another entity (e.g., a router) with an EVDO access card. Similarly, entities using another type of access network (e.g., WiFi) may reside behind a NAT or firewall as well. NATs and firewalls typically create bindings and pinholes inside themselves and generally prevent packets sent by a first entity from being sent to a second entity behind the NAT or firewall unless the second entity initiated contact with the first entity. When the second entity sends a packet to the first entity, a binding or pinhole is created inside the NAT or firewall, which in turn enables packets to be sent in the reverse direction. The lifetime of this binding, though, may be limited. Some NATs, for example, may destroy bindings after as few as thirty seconds of inactivity. Packets subsequently sent from the first entity to the second entity likely would not be delivered. If the first entity is an ACP and the second entity a SIP endpoint behind an access terminal, the SIP endpoint may not receive incoming calls or other requests.

Accordingly, SIP endpoints should send traffic to an ACP at regular intervals to maintain bindings behind any associated NATs or firewalls. Since such messages may be sent with substantial frequency, overhead for processing these messages should be minimized. Also, a NAT binding change (e.g. because the NAT rebooted) should be detectable.

A compression service enabler facilitates a more efficient use of the airlink bandwidth, as well as minimizes airlink propagation delay, by compressing SIP signaling between an access terminal and an ACP. This compression leads to smaller messages, which use less bandwidth and can be transmitted faster.

In certain embodiments of the present invention, a compression service enabler may implement a compression method generally known as "SigComp." SigComp generally allows for the use of one or more compression algorithms. The compression algorithms used may differ among applications, and a compression algorithm may even be optimized for a particular application.

Accordingly, a compression service enabler may implement different compression algorithms in various embodiments. Moreover, a static dictionary may be loaded to improve initial compression phases. In such an embodiment, a service provider may optimize compression for particular applications that may be deployed and supported by the service provider, thereby making them both faster (less transmission propagation delay) and more airlink efficient (less data).

Policy hooks associated with a compression service enabler may include the compression algorithms and static dictionaries.

A request routing service enabler may provide SIP-layer routing of SIP messages within a network. A request routing service enabler supports routing to many types of entities, including SIP users, SIP servers, VoIP peer networks, an the public switched telephone network.

A user generally is assigned to an ACP when they register an access terminal, and if a user registers multiple access terminals, each should be assigned to the same ACP in order to provide coherent feature handling. The binding between a public user identity (telephone number or SIP(S)-URI) and its associated ACP is stored in the SDMC, so routing of requests to registered SIP users typically involves a lookup in the SDMC. If an entry is found, then routing to the ACP continues.

Only an ACP has this capability, however. So if a request from the PSTN or VoIP peer network is received, they are sent to a default ACP. The default ACP, in turn, performs this routing lookup and forwards the message accordingly.

SIP users may not have an ACP assigned, e.g. when they have not registered any devices. Still, requests for them may be received, e.g. an incoming call or a presence subscription. In that case, the SDMC lookup may not yield any result. An ACP may be assigned to a targeted user then, with an indication that the ACP is assigned for an unregistered user. The request to the unregistered user may then be routed to the assigned ACP.

SIP servers generally have names associated with them. By default, a SIP server has a domain name and requests addressed to a SIP server follow standard DNS resolution procedures. Specific routing tables, though, may include a SIP server name that points to a specific next-hop (IP-address or domain-name). Such server name routes may be either global or ACP-specific. Generally, such specific routes are stored in the SDMC and cached by the relevant ACPs.

A request also may be routed to a peer network. Requests without telephone numbers generally are routed according to a domain-name of a SIP(S)-URI. By default, standard DNS resolution procedures should be followed to determine the next hop (entry point to peer domain). But again, specific routing tables may specify a SIP domain name points to one or more indicated next-hops (IP-address or peer server domain-name). Each of those next-hops may be used, and the determination of which to use may be based on an associated routing policy. Such routing policy may use time-of-day, load-balancing, etc. Domain routing tables and associated policies may be either global or ACP-specific. Generally, they are stored in the SDMC and cached by the relevant ACPs.

When a request is addressed to a telephone number not served by a service provider, the request may be sent to either the PSTN or a VoIP peer network. A telephony number may be routed based upon ENUM or specific service provider route tables.

ENUM maps a specific telephone number to another URI. If a URI is a SIP(S)-URI with a domain-name to which a service provider wants to route a request, the domain-name based routing procedure may be invoked. Different "types" of ENUM may be used, such as public ENUM, or carrier ENUM where several providers agree to use part of the DNS tree for ENUM-like functionality.

If there is no ENUM entry (or ENUM is not being used), specific telephone number route tables may be used for routing a request. These routing tables typically are based on prefixes, and may map to one or more next-hops. The next-hop(s) may be either a PSTN gateway or a VoIP peer provider (e.g., another provider that provides PSTN termination services). In either case, route policies may be associated with route entries to guide the selection of next-hops. Telephone number routing tables and associated policies may be either global or ACP-specific. They may be stored in the SDMC and cached by the relevant ACPs.

Accordingly, policy hooks for a routing service enabler may include routing tables, which further may include mapping of users (telephone number and SIP(S)-URIs) to an ACP stored in the SDMC, global or ACP-specific server name routes (server name mapping to next hop with associated route policies), global or ACP-specific domain name routes (domain name mapping to next hop with associated route policies), telephone-number routes (prefix mapping to next hop with associated route policies), and Public and or Carrier ENUM.

A VoIP peering service enabler provides functions associated with requests exchanged between SIP networks operated by distinct service providers. VoIP peering is typically done via a Session Border Controller, which is a logical collection of signaling and possibly media functions involved in exchanging signaling and media with a peer network.

An accounting service enabler provides general accounting support in an ACP in an accounting framework that defines trigger points for charging events. An accounting service enabler in an ACP may support different types of triggers, including triggers for services provided by an ACP itself, and triggers for services provided by application servers.

Triggers for services provided by an ACP itself include things such as basic voice calls, presence subscriptions, and routing of requests to other entities (e.g., a PSTN gateway, or any other capability that is native to an ACP). Accordingly, much accounting data may be generated by an ACP alone. In alternative or additional embodiments of the present invention, though, an accounting service enabler also may include triggers for charging events on all incoming calls and requests from the PSTN or VoIP peers. Producing charging events for outgoing calls and requests may aid in monitoring and troubleshooting as well. Accounting data may be generated based on functions supported by an ACP service enablers, and hence both triggers and charging data may be relatively static. Nonetheless, triggers and charging data generally are not hard-coded in an ACP.

In certain embodiments of the present invention, an accounting service enabler also may include triggers and accounting data for application servers. If an application server is invoked, an accounting service enabler may generate an associated charging event. The contents of this charging event are configurable as well.

The fact that a particular application server is invoked may be sufficient charging information for many application services. Some application servers, though, may need application-specific accounting. Accordingly, such an application server may use an accounting service enabler to generate its charging events.

As FIGS. 1 and 2 illustrate, certain embodiments of the present invention also include the concept of a "media enabler." A media enabler is a function or capability that facilitates the exchange of media streams between entities in real-time. FIG. 2 illustrates media enablers 30 within access terminal 2, but media enablers also may exist in the network. Media enablers 30 in access terminal 2 may include audio codecs, video codecs, text messaging, rich media messaging, and fax relay, as illustrated in FIG. 2. Media enablers in the network may include media servers (as shown in FIG. 1) and NAT relays.

The set of media enablers supported by the access terminal and the network generally determines the set of communications services that can be supported. Similar to service enablers, media enablers have a policy hook associated with them, which may control the overall operation of the media enabler (e.g., allowed usage). A media enabler may or may not be authorized to be used, and the way a particular media enabler can be used (e.g., choice of audio codec) may be restricted as well.

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation and may be stored on non-transitory computer-readable media. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

In particular, flow engine 16, rules engine 20, and service enablers 18 have been described with reference to FIG. 1 as elements of a single unit, but the functions associated with each may be distributed across a network as desired. Moreover, service enablers 18 are merely illustrative of certain concepts, and are not intended to limit the scope of the present invention to these examples.

What is claimed is:

1. A method for providing feature services in a multimedia communication environment, the method comprising:
  receiving a signaling message, which can be a request or a response;
  running one or more scripts to compare the signaling message with control data to identify one or more service enablers that are responsive to the signaling message, the one or more service enablers selected from a group consisting of: a privacy service enabler, a user security service enabler, a compression service enabler, and a firewall traversal service enabler, the one or more service enablers configured to apply a matching operation to determine a token identifying an invoked feature and to associate the token with a dialog, the one or more service enablers programmed with feature invocation logic based on the token; and
  invoking each identified service enabler, wherein each identified service enabler operates in accordance with an associated policy hook, and the policy hook is externally configurable and controls the operation of the service enablers.

2. The method of claim 1, wherein at least one of the service enablers is a service capability interaction manager that may maintain dialog state and may be further responsive to the dialog state.

3. The method of claim 1, wherein the control data is selected from the group consisting of:
  a signaling message response value or response parameter value;

provisioned data;
dynamic data; and
data acquired from an operating environment of the scripts.

4. The method of claim 3, wherein the scripts further identify one or more application servers that are responsive to the signaling message.

5. The method of claim 1, wherein the control data is in an XML document format and XPath is used to enable comparison with one or more elements in the XML document.

6. The method of claim 1, wherein the service enablers are selected from the group consisting of:
a user identity service enabler;
a bearer interaction service enabler;
the privacy service enabler;
a request authorization service enabler;
a user data repository service enabler;
a presence service enabler;
a location service enabler;
the user security service enabler;
a SIP infrastructure security service enabler;
a service capability interaction manager service enabler;
a SIP compression service enabler;
the firewall traversal service enabler;
a request routing service enabler;
a voice-over-IP service peering enabler; and
an accounting service enabler.

7. The method of claim 1:
the one or more service enablers comprising a user identity service enabler; and
the user identity service enabler invoked to provide a valid public identity of a user to one or more elements of a system.

8. The method of claim 1:
the one or more service enablers comprising a request routing service enabler; and
the request routing service enabler invoked to provide Session Initiation Protocol (SIP) layer routing of a plurality of SIP messages.

9. The method of claim 1, a binding maintained using an internal event and independent of an external request.

10. A multimedia communication system comprising:
one or more service enablers selected from a group consisting of a privacy service enabler, a user security service enabler, a compression service enabler, and a firewall traversal service enabler, the one or more service enablers configured to apply a matching operation to determine a token identifying an invoked feature and to associate the token with a dialog, the one or more service enablers programmed with feature invocation logic based on the token;
a policy hook associated with each service enabler, wherein the policy hook is externally configurable and controls the operation of the service enablers; and
a processing component operable to:
run one or more scripts to compare a signaling message with control data to identify one or more of the service enablers that are responsive to the signaling message; and
invoke each identified service enabler in accordance with the associated policy hook.

11. The system of claim 10, wherein at least one of the invoked service enablers is a service capabilities interaction manager which uses a user-specific script, and is operable to identify one or more other service enablers or application servers to provide user-specific multimedia communication features.

12. The system of claim 11, wherein at least one of the identified application servers inserts one or more tokens into the same or a second signaling message, the service capabilities interaction manager receives that signaling message from the application server, and the service capabilities interaction manager compares the token(s) to the control data to identify one or more of the application servers to provide user-specific multimedia communication features.

13. The system of claim 10, wherein each service enabler is identified by a token that may be changed without requiring software upgrades.

14. The system of claim 10, wherein the control data is selected from the group consisting of:
a signaling message response value or response parameter value;
provisioned data;
dynamic data;
data acquired from an external application; and
data acquired from an associated operating system.

15. The system of claim 10, wherein the control data is one or more elements selected from an extensible markup language (XML) document using XPath.

16. The system of claim 10, wherein the signaling message is associated with one or more media streams, and at least one of the service enablers is a bearer interaction management service enabler operable to associate an application identifier token with the signaling message and to associate a media stream identifier token with each media stream associated with the signaling message; and further comprising:
sending the application identifier token and the media stream identifier token(s) to a policy server;
receiving one or more tokens from the policy server; and
providing the token(s) from the policy server to at least one of the service enablers where it can be used as input for further comparison with control data.

17. The system of claim 10, wherein the service enablers are selected from the group consisting of:
a user identity service enabler;
a bearer interaction service enabler;
the privacy service enabler;
a request authorization service enabler;
a user data repository service enabler;
a presence service enabler;
a location service enabler;
the user security service enabler;
a SIP infrastructure security service enabler;
a service capability interaction manager service enabler;
a SIP compression service enabler;
the firewall traversal service enabler;
a request routing service enabler;
a voice-over-IP service peering enabler; and
an accounting service enabler.

18. The system of claim 10:
the one or more service enablers comprising a user identity service enabler; and
the user identity service enabler invoked to provide a valid public identity of a user to one or more elements of a system.

19. The system of claim 10:
the one or more service enablers comprising a request routing service enabler; and
the request routing service enabler invoked to provide Session Initiation Protocol (SIP) layer routing of a plurality of SIP messages.

20. One or more computer-readable media storing a computer program for providing feature services in a multimedia environment, the computer code when executed by a processor is operable to:
  compare a signaling message with control data to identify one or more service enablers or application servers that are responsive to the signaling message, the one or more service enablers selected from a group consisting of: a privacy service enabler, a user security service enabler, a compression service enabler, and a firewall traversal service enabler, the one or more service enablers configured to apply a matching operation to determine a token identifying an invoked feature and to associate the token with a dialog, the one or more service enablers programmed with feature invocation logic based on the token; and
  invoke each responsive service enabler in accordance with an associated policy hook, wherein the policy hook is externally configurable and controls the operation of the service enablers.

21. The computer-readable media of claim 20, wherein at least one of the service enablers is a service capability interaction manager that may maintain dialog state associated with a user communication session and may invoke additional service enablers responsive to the dialog state.

22. The computer-readable media of claim 20, wherein each service enabler is identified by a token that may be changed without requiring software upgrades.

23. The computer-readable media of claim 20, wherein the control data is selected from the group consisting of:
  a signaling message response value or response parameter value;
  provisioned data;
  dynamic data;
  data acquired from an external application; and
  data acquired from an associated operating system.

24. The computer-readable media of claim 20, wherein the service enablers are selected from the group consisting of:
  a user identity service enabler;
  a bearer interaction service enabler;
  the privacy service enabler;
  a request authorization service enabler;
  a user data repository service enabler;
  a presence service enabler;
  a location service enabler;
  the user security service enabler;
  a SIP infrastructure security service enabler;
  a service capability interaction manager service enabler;
  a SIP compression service enabler;
  the firewall traversal service enabler;
  a request routing service enabler;
  a voice-over-IP service peering enabler; and
  an accounting service enabler.

25. The computer-readable media of claim 20:
  the one or more service enablers comprising a user identity service enabler; and
  the user identity service enabler invoked to provide a valid public identity of a user to one or more elements of a system.

26. The computer-readable media of claim 20:
  the one or more service enablers comprising a request routing service enabler; and
  the request routing service enabler invoked to provide Session Initiation Protocol (SIP) layer routing of a plurality of SIP messages.

27. A system for providing feature services in a multimedia communication environment, the method comprising:
  means for receiving a signaling message;
  means for identifying one or more service enablers that are responsive to the signaling message, the one or more service enablers selected from a group consisting of: a privacy service enabler, a user security service enabler, a compression service enabler, and a firewall traversal service enabler, the one or more service enablers configured to apply a matching operation to determine a token identifying an invoked feature and to associate the token with a dialog, the one or more service enablers programmed with feature invocation logic based on the token;
  means for invoking each responsive service enabler; and
  means for controlling the operation of each service enabler through one or more associated policies, wherein the associated policies are externally configurable.

28. The system of claim 27, further comprising means for maintaining dialog state, means for managing service capability interactions between the responsive service enablers, and means for invoking service enablers and application servers to provide user-specific multimedia communication features.

29. An application control point for use in a multimedia communication system, the application control point comprising:
  a signaling protocol interface;
  a programmable flow engine;
  a rules engine;
  one or more service enablers comprising a service capability interaction manager (SCIM) configured to apply a matching operation to determine a token identifying an invoked feature and to associate the token with a dialog; and
  one or more policy hooks associated with each service enabler;
  wherein the rules engine is operable to match expressions in input data;
  wherein the programmable flow engine is operable to process signaling messages received through the signaling protocol interface, to interact with the rules engine to compare the signaling messages with control data, and to interact with one or more service enablers or application servers to provide multimedia communication features responsive to the signaling messages, the SCIM programmed with feature invocation logic based on the token, the one or more service enablers elected from a group consisting of: a privacy service enabler, a user security service enabler, a compression service enabler, and a firewall traversal service enabler; and
  wherein the policy hooks are externally configurable and control the operation of the service enablers.

30. The application control point of claim 29, wherein at least one of the service enablers is a service capabilities interaction manager operable to process the signaling messages and the control data to identify one or more service enablers or application servers to provide user-specific multimedia communication features.

31. The application control point of claim 30, wherein an operation to match expressions is selected from the group consisting of:
  a regular expression matching operation;
  an XML document matching operation; and
  an XPath based matching operation where XPath is used to select one or more elements from an XML document as input to the matching operation.

32. The application control point of claim 30, wherein the control data is selected from the group consisting of:
  a signaling message response value or response parameter value;
  dialog state information;

application server state information provided in the form of one or more tokens;
provisioned data;
dynamic data;
presence data;
time of day;
operating environment state information;
one or more tokens returned from a policy server; and
one or more tokens returned from one of the service enablers.

33. The application control point of claim 29, further comprising a policy server, and wherein at least one of the service enablers is a bearer interaction service enabler operable to identify an application descriptor associated with the signaling messages, to identify a media stream descriptor associated with each media stream in the signaling message, and to interact with the policy server and the service capabilities manager to provide user-specific multimedia communication features according to one or more policies stored in the policy server.

34. The application control point of claim 33, wherein the application descriptor and the media descriptor(s) are passed to the policy server and the policy server returns one or more tokens that are processed by one or more of the service enablers.

35. The application control point of claim 33, wherein the application descriptor and the media stream descriptor are constructed by a script that performs a syntactic computation on the signaling messages, and the script can be changed without requiring software upgrades.

36. The application control point of claim 35, wherein the syntactic computation is a regular expression match.

37. The application control point of claim 29:
the one or more service enablers comprising a user identity service enabler; and
the user identity service enabler invoked to provide a valid public identity of a user to one or more elements of a system.

38. The application control point of claim 29:
the one or more service enablers comprising a request routing service enabler; and
the request routing service enabler invoked to provide Session Initiation Protocol (SIP) layer routing of a plurality of SIP messages.

39. An access terminal for use in a multimedia communication system, the access terminal comprising:
a signaling protocol interface;
a programmable flow engine;
a rules engine;
one or more service enablers comprising a service capability interaction manager (SCIM) configured to apply a matching operation to determine a token identifying an invoked feature and to associate the token with a dialog; and
one or more policy hooks associated with each service enabler;
wherein the rules engine is operable to match expressions in input data;
wherein the programmable flow engine is operable to process signaling messages received through the signaling protocol interface, to interact with the rules engine to compare the signaling messages with control data, and to interact with one or more service enablers to provide multimedia communication features responsive to the signaling messages, the SCIM programmed with feature invocation logic based on the token, the one or more service enablers elected from a group consisting of: a privacy service enabler, a user security service enabler, a compression service enabler, and a firewall traversal service enabler; and
wherein the policy hooks are externally configurable and control the operation of the service enablers.

40. The access terminal of claim 39, wherein at least one of the service enablers is a service capabilities interaction manager operable to process the control data and user-specific signaling messages received through the signaling protocol interface to identify one or more service enablers, and to interact with the service enablers to provide user-specific multimedia communication features responsive to the signaling messages.

41. The access terminal of claim 39, further comprising one or more media enablers, and an externally configurable policy hook associated with each media enabler to control the operation of the media enablers.

42. The access terminal of claim 39:
the one or more service enablers comprising a user identity service enabler; and
the user identity service enabler invoked to provide a valid public identity of a user to one or more elements of a system.

43. The access terminal of claim 39:
the one or more service enablers comprising a request routing service enabler; and
the request routing service enabler invoked to provide Session Initiation Protocol (SIP) layer routing of a plurality of SIP messages.

\* \* \* \* \*